United States Patent Office 3,169,992
Patented Feb. 16, 1965

3,169,992
AMINE THIOSULFATE ANHYDRIDES
Richard W. Henn, Rochester, N.Y., assignor to Eastman Kodak Company, Rochester, N.Y., a corporation of New Jersey
No Drawing. Filed Jan. 9, 1961, Ser. No. 81,233
7 Claims. (Cl. 260—583)

This invention relates to novel fixing agents for photographic silver halide emulsion layers, and more specifically, to amine thiosulfate anhydrides and their preparation.

Photographic silver halide emulsions are commonly fixed following development by dissolving the undeveloped silver halide in an aqueous solution of a thiosulfate and then washing this water soluble silver halide thiosulfate complex from the emulsions. The thiosulfates most commonly employed for this purpose are the sodium and ammonium thiosulfates, although salts of other metals and amine thiosulfates have been described. Ammonium thiosulfate offers the advantage over sodium thiosulfate of more rapid action, but offers certain disadvantages with regard to stability because of the volatility of the ammonia and greater propensity to sulfurize, i.e., decompose with the deposition of sulfur. The amine thiosulfates also offer advantages in rapid fixation and possess increased stability but have not come into general use because of the difficulty of isolating crystalline salts.

It is therefore an object of my invention to provide a novel fixing agent which offers the advantages of the rapid fixation and increased stability characteristic of amine thiosulfates, but which offers the further advantages of storage and use at high concentrations with freedom from crystalline residue.

Another object is to provide thiosulfate anhydrides of amines as novel fixing agents.

Another object is to provide a process for making my novel fixing agents.

Another object is to provide a new class of fixing agents which are free from the tendency to sulfurize.

Other objects will become apparent from the following specification and claims.

These and other objects are accomplished by the use of the amine thiosulfate anhydrides of my invention, which have the formula:

$$Z_x(SO_2)_{y-1}(S_2O_2)$$

wherein Z represents an amine, $x$ is an integer of from 2 to 16, and $y$ is an integer of 1 to 17. These compounds are prepared by passing sulfur dioxide into the amine Z and then stirring finely divided sulfur into the resulting amine-sulfur dioxide addition product. It is helpful and in some instances necessary to heat the reaction mixture. The sulfur dissolves forming the amine thiosulfate anhydride which on dilution with water yields the corresponding amine thiosulfate which is the active fixing agent.

My compounds can be further described as having the formula:

$$(R_3N)_x(SO_2)_{y-1}(S_2O_2)$$

wherein R represents a hydrogen atom; an alkyl group having from 1 to 18 carbon atoms, such as methyl, ethyl, propyl, isopropyl, butyl, secondary butyl, tertiary butyl, hexyl, octyl, decyl, dodecyl, tridecyl, pentadecyl, hexadecyl, heptadecyl, octadecyl, etc.; an alkyl group having from 1 to 18 carbon atoms substituted with one or more of any of the commonly used substituents, such as hydroxy, for example, β-hydroxyethyl, γ-hydroxypropyl, hydroxybutyl, hydroxydecyl, hydroxypentadecyl, hydroxyoctadecyl, etc., an amino group, for example, aminoethyl, 2-amino-1-hydroxyethyl, aminopropyl, 2-amino-3-hydroxypropyl, aminooctyl, aminododecyl, aminopenta-decyl, aminooctadecyl, etc., carboxy groups, such as carboxymethyl carboxy ethyl, carboxybutyl, carboxyoctyl, carboxydodecyl, carboxyoctadecyl, etc., ester groups, for example, carbomethoxypropyl, carbopropoxyhexyl, carbobutoxydodecyl, etc., alkoxy groups, for example, methoxymethyl, methoxybutyl, ethoxyoctyl, butoxydodecyl, etc., arylalkyl groups, for example, benzyl, phenylpropyl, phenylhexyl, phenyldodecyl, etc., chlorine atoms, bromine atoms, iodine atoms, fluorine atoms, for example, 2-chloroethyl, 2-dibromoethyl, 1,3-difluoropropyl, 6-chlorohexyl, iodooctadecyl, etc.; an aryl group, such as phenyl, naphthyl, and these groups substituted with any of the commonly used substituents, such as hydroxy groups, amino groups, alkoxy groups, carboxy groups, ester groups, halogen atoms, etc.; or R may be a heterocyclic group, such as a morpholino group, a piperazino group, a piperidino group, etc., or any of these heterocyclic groups substituted with commonly used substituents such as hydroxy groups, alkoxy groups, carboxy groups, ester groups, amino groups, halogen atoms, etc., provided that not more than two R groups represent hydrogen atoms; and $x$ and $y$ are as defined above.

Since it is the $(SO_2)_{y-1}(S_2O_2)$ moiety of my compounds that forms upon dilution with water, thiosulfate ions that complex with the silver halide in the fixing process, it is obvious that compounds in which this moiety forms as high a percentage of the total weight of the compound as possible will be most advantageous from an economic standpoint, or where weight and volume are important considerations. For some applications it may be desirable to use compounds having R groups with large numbers of carbon atoms in them, however, it is usually advantageous to use R groups having relatively small numbers of carbon atoms with amino groups as substituents, since each amino group can have a $$(SO_2)_{y-1}(S_2O_2)$$

group attached to it.

The preferred compounds of my invention are those in which R is an alkyl group having from 1 to 6 carbon atoms and in which $x$ is in the range of from 2 to 4 and $y$ in the range of 1 to 3.

Representative and particularly useful amine thiosulfate anhydrides are made according to my invention from the following typical amines:

(1) Iminodiethanol
(2) 2-aminoethanol
(3) 1,3-diaminopropanol
(4) Ethylenediamine
(5) Diethylenetriamine
(6) Aniline
(7) Toluidine
(8) Benzylamine
(9) Morpholine
(10) Piperazine
(11) Piperidine
(12) Nitrilotriethanol These amines are available commercially.

My invention is further described by the following examples which illustrate the preparation and use of typical amine thiosulfate anhydrides.

EXAMPLE 1

Sulfur dioxide was passed into iminodiethanol until a product containing a mole of sulfur dioxide for each two moles of amine was obtained as a colorless, viscous liquid. The equivalent of ½ mole of sulfur was then added per mole of sulfur dioxide by heating the amine-sulfur dioxide complex on a steam bath and stirring in finely divided sulfur. This also resulted in a colorless, viscous liquid. When diluted with water, this product formed an efficient fixing bath for film. For example, a solution obtained by diluting 10 g. of this iminodiethanol thiosulfate anhydride with 30 g. of water, or about 0.88 molar with regard to the thiosulfate, was found to clear a negative speed film containing a silver bromoiodide emulsion in 1.5 minutes at 75° F., while a bath containing 1.0 molar sodium thiosulfate required 2.5 minutes to clear this film.

EXAMPLE 2

Sulfur dioxide was passed into 2-aminoethanol to give a product containing 4 moles of 2-aminoethanol per mole sulfur dioxide. Then ¼ mole of sulfur was dissolved by warming and stirring this solution. The resulting product was a clear brown fluid. One volume diluted with 3 volumes of water (about ¼ molar in thiosulfate) cleared a fine-grain positive speed silver bromoiodide emulsion in 2 minutes, while a similar solution of the amine-sulfur dioxide adduct without the added sulfur failed to clear the film in 4 minutes.

EXAMPLE 3

An ethylenediamine-sulfur dioxide addition product containing 0.44 mole of sulfur dioxide per mole of ethylenediamine was prepared by passing 32 g. of sulfur dioxide into 68 g. of ethylenediamine. This material was a dark brown solid. Three g. of sulfur were dissolved in 20 g. of the ethylenediamine-sulfur dioxide addition product by warming the addition product to make it fluid and then stirring in the sulfur at about 140° F. On dilution with water, this gave a clear brown solution which fixed developed photographic film well.

By the use of a suitable solvent in the reaction mixture used in preparing the sulfur dioxide adduct, it is possible to increase the amount of sulfur dioxide added to a mole of amine. This is illustrated in Examples 4, 5, 6, and 7. Solvents can also be used to advantage in this process when adducts of some of the higher molecular weight amines are to be made.

EXAMPLE 4

An ethylenediamine-sulfur dioxide addition product containing 0.58 mole of sulfur dioxide per mole of ethylenediamine was prepared by passing 72.5 g. of sulfur dioxide into 117 g. of ethylenediamine dissolved in 117 g. of ethanol. This product was a white liquid. 3.2 g. of sulfur were dissolved in 30.6 g. of the addition product at 140° F. This ethylenediamine thiosulfate anhydride, a light brown fluid, dissolved readily in a dilute solution of sodium sulfite to give a nearly colorless solution which efficiently fixed developed photographic films.

EXAMPLE 5

An ethylenediamine-sulfur dioxide addition product containing 1.20 moles of sulfur dioxide per mole of ethylenediamine was produced by passing 115 g. of sulfur dioxide into a solution containing 90 g. of ethylenediamine in 90 g. of ethanol. The product was a brown colored liquid. Four g. of sulfur dissolved readily on warming and stirring in 30 g. of the addition product. This tended to solidify on cooling. The solid was readily soluble in water or in a dilute sodium sulfite solution.

EXAMPLE 6

A sulfur dioxide addition product of diethylenetriamine containing 0.6 mole of sulfur dioxide per mole of diethylenetriamine was made by passing 48.0 g. of sulfur dioxide into a solution of 130 g. of the amine in 130 g. of ethanol. 1.6 g. of sulfur were added to 40 g. of the addition product, a white liquid. The sulfur dissolved only slowly at room temperature but rapidly on warming. On dilution with water this diethylenetriamine thiosulfate anhydride yielded a clear brown solution which tended to sulfurize in the absence of sulfite ion.

EXAMPLE 7

A sulfur dioxide addition product of diethylenetriamine containing 2.6 moles of sulfur dioxide per mole of diethylenetriamine was prepared by passing 139 g. of sulfur dioxide into a solution containing 88 g. of the amine and 88 g. of ethanol. This product was a dark viscous liquid.

To 36.0 g. of this addition product were added 1.6 g. of sulfur which dissolved on stirring and warming. This diethylenetriamine thiosulfate anhydride was diluted with water to yield a clear stable solution of moderate fixing capacity.

In another preparation 6.4 g. of sulfur were dissolved in 31.5 g. of the dark viscous liquid addition product. This yielded another diethylenetriamine thiosulfate anhydride that was a dark brown paste which yielded a fixing bath on solution with dilute (2 percent) sodium sulfite.

EXAMPLE 8

One-half mole of sulfur dioxide was added to a mole of 1,3-diaminopropanol to yield a viscous solid. One-quarter mole of sulfur dissolved readily upon warming in this adduct. The resulting brown solid was water soluble and showed active fixing properties.

The following example will illustrate how my amine thiosulfate anhydrides can be used to advantage in solvent transfer processes.

EXAMPLE 9

An adduct of 2-aminoethanol and sulfur dioxide was prepared by passing sulfur dioxide into a beaker containing 2-aminoethanol. The final product contained ¼ mole of sulfur dioxide per mole of 2-aminoethanol or 20.8 percent by weight. A 121 g. quantity of this product was warmed to 140° F. with stirring while 6.3 g. of sulfur were added. Solution of the sulfur was essentially complete after 1 hour to yield a bright red product having a ratio of ½ mole of sulfur per mole of sulfur dioxide.

This amine thiosulfate anhydride was added in a concentration of 30 g. per liter to a developer containing 4,4-dimethyl-1-phenyl-3-pyrazolidone and hydroquinone as the developing agents. This solution was used to develop an emulsion by a solvent transfer process, in which the success of the result depended on appropriate silver halide solvent action on the emulsion. A good image of usable contrast was obtained when the 2-aminoethanol thiosulfate anhydride was used. In comparison only a week image was obtained when an unmodified 2-aminoethanol-sulfur dioxide adduct was employed. The following table gives the gammas obtained in film by solvent transfer processes in which the two silver halide solvents were used.

*Table I*

| Silver Halide Solvent | Contrast ($\gamma$) |
| --- | --- |
| 2-Aminoethanol-sulfur dioxide adduct | 0.37 |
| 2-Aminoethanol thiosulfate anhydride | 0.80 |

The thiosulfate anhydrides of aromatic amines such as aniline, toluidine, etc., and of heterocyclic amines such as morpholine, piperazine, piperadine, etc., are prepared in a manner similar to that used to prepare the alkyl amine thiosulfate anhydrides.

Similarly, other amine thiosulfate anhydrides can be produced which are valuable for use as fixing agents for conventional processes as well as solvent transfer type processes. Although my compounds made from the lower molecular weight amines are particularly advantageous because of the greater amount of thiosulfate ion released per unit weight of compound, the higher molecular weight amines can be used to make the thiosulfate anhydrides for special instances where the larger size molecules may be used to advantage. Where the larger amine molecules are used, solubilizing substituents may be added to give the desired solubility characteristics.

My amine thiosulfate anhydride fixing agents can be used to advantage in any of the applications where fixing agents are used. For example, they are ideal for preparing concentrated fixing compositions which are dissolved in water just prior to use or for preparing concentrated solutions that are diluted with water to make the fixing bath. The anhydrides can be used to advantage as the fixing agent in monobaths that contain the materials for silver halide emulsion development and fixation in a single process step.

Water solutions of amine thiosulfate anhydrides are used to fix developed silver halide emulsion layers. The aminethiosulfate compound formed when some of my anhydrides are diluted with water tend to sulfurize, however, this is prevented by having about 2 percent of sodium sulfite present in the solution. In addition to an alkali sulfite, any of the other compounds commonly used in fixing baths may be used in my compositions, such as acetic acid, boric acid, and other materials used to adjust pH, hardening agents such as potassium alum, gluteraldehyde, succinaldehyde, etc.

The novel amine thiosulfate anhydride fixing agents of my invention are valuable for use in conventional as well as solvent transfer type processing for silver halide emulsions. These compounds provide a stable, highly concentrated fixing material which may be readily prepared by dissolving sulfur in warm solutions of the amine-sulfur dioxide adduct. These products need only be diluted with water or dilute sodium sulfite solution to make a fixing bath characterized by giving rapid fixation as well as other advantageous properties demonstrated by amine thiosulfates. My amine thiosulfate anhydrides, however, are superior to the corresponding amine thiosulfates because they do not crystallize or sulfurize upon storage.

The invention has been described in detail with particular reference to preferred embodiments thereof but it will be understood that variations and modifications can be effected within the spirit and scope of the invention as described hereinabove and as defined in the appended claims.

I claim:

1. An amine thiosulfate anhydride of the formula:

$$(R_3N)_x(SO_2)_{y-1}(S_2O_2)$$

wherein R represents a member selected from the class consisting of the hydrogen atom, an alkyl group having from 1 to 6 carbon atoms, a hydroxy substituted alkyl group having from 1 to 6 carbon atoms, and an amino substituted alkyl group having from 1 to 6 carbon atoms, such that not more than two R groups represent the hydrogen atom; $x$ is an integer of from 2 to 16; and $y$ is an integer of from 1 to 17, said amine thiosulfate anhydride being capable of storage without crystallizing and without sulfurizing.

2. An amine thiosulfate anhydride having the formula of claim 1 in which $x$ is in integer of from 2 to 4 and $y$ is an integer of from 1 to 3.

3. An amine thiosulfate anhydride having the formula:

$$[NH(CH_2CH_2OH)_2]_x(SO_2)_{y-1}(S_2O_2)$$

wherein $x$ represents an integer of from 2 to 4, and $y$ represents an integer of from 1 to 3, said amine thiosulfate anhydride being capable of storage without crystallizing and without sulfurizing.

4. An amine thiosulfate anhydride having the formula:

$$[H_2NC_2H_4OH]_x(SO_2)_{y-1}(S_2O_2)$$

wherein $x$ representsan integer of from 2 to 4, and $y$ represents an integer of from 1 to 3, said amine thiosulfate anhydride being capable of storage without crystallizing and without sulfurizing.

5. An amine thiosulfate anhydride having the formula:

$$[H_2NCH_2-\underset{\underset{OH}{|}}{CH}-CH_2NH_2]_x(SO_2)_{y-1}(S_2O_2)$$

wherein $x$ represents an integer of from 2 to 4, and $y$ represents an integer of from 1 to 3, said amine thiosulfate anhydride being capable of storage without crystallizing and without sulfurizing.

6. An amine thiosulfate anhydride having the formula:

$$[H_2N-CH_2CH_2-NH_2](SO_2)_{y-1}(S_2O_2)$$

wherein $x$ represents an integer of from 2 to 4, and $y$ represents an integer of from 1 to 3, said amine thiosulfate anhydride being capable of storage without crystallizing and without sulfurizing.

7. An amine thiosulfate anhydride having the formula:

$$[(H_2NC_2H_4)_2NH]_x(SO_2)_{y-1}(S_2O_2)$$

wherein $x$ represents an integer of from 2 to 4, and $y$ represents an integer of from 1 to 3, said amine thiosulfate anhydride being capable of storage without crystallizing and without sulfurizing.

References Cited in the file of this patent

UNITED STATES PATENTS

| | | |
|---|---|---|
| 2,069,167 | Kharasch | Jan. 26, 1937 |
| 2,260,665 | Ham | Oct. 28, 1941 |
| 2,412,607 | Farr et al. | Dec. 17, 1946 |
| 2,453,347 | Russell | Nov. 9, 1948 |
| 2,483,213 | Lecher et al. | Sept. 27, 1949 |
| 2,489,316 | Proell | Nov. 29, 1949 |

UNITED STATES PATENT OFFICE
CERTIFICATE OF CORRECTION

Patent No. 3,169,992                      February 16, 1965

Richard W. Henn

It is hereby certified that error appears in the above numbered patent requiring correction and that the said Letters Patent should read as corrected below.

Column 6, line 15, for "representsan" read -- represents an --; line 30, for that portion of the formula reading $-NH_2]$           read           $-NH_2]_x$ Signed and sealed this 19th day of April 1966.

(SEAL)
Attest:

ERNEST W. SWIDER
Attesting Officer

EDWARD J. BRENNER
Commissioner of Patents